US00RE42087E

(19) United States
(12) Reissued Patent
Mertel

(10) Patent Number: US RE42,087 E
(45) Date of Reissued Patent: Feb. 1, 2011

(54) TUNABLE ANTENNA SYSTEM

(75) Inventor: Michael E. Mertel, Medina, WA (US)

(73) Assignee: Fluid Motion, Inc., Bellevue, WA (US)

(21) Appl. No.: 11/326,621

(22) Filed: Jan. 4, 2006

Related U.S. Patent Documents

Reissue of:
(64) Patent No.: 6,677,914
Issued: Jan. 13, 2004
Appl. No.: 10/146,542
Filed: May 14, 2002

U.S. Applications:
(60) Provisional application No. 60/291,299, filed on May 15, 2001.

(51) Int. Cl.
*H01Q 21/12* (2006.01)

(52) U.S. Cl. ..... 343/815; 343/814; 343/819; 343/821

(58) Field of Classification Search ..... 343/702, 343/814, 815, 819, 821, 901, 903
See application file for complete search history.

(56) References Cited

U.S. PATENT DOCUMENTS

| | | | | | |
|---|---|---|---|---|---|
| 2,967,300 | A | | 1/1961 | Haughwout | 343/750 |
| 2,981,834 | A | * | 4/1961 | Holloway et al. | 455/276.1 |
| 3,487,415 | A | | 12/1969 | Simons | 343/814 |
| 3,653,056 | A | | 3/1972 | Peterson | 343/795 |
| 3,683,391 | A | | 8/1972 | Callaghan | 343/802 |
| 4,028,709 | A | | 6/1977 | Berkowitz et al. | 343/819 |
| 4,290,071 | A | | 9/1981 | Fenwick | 343/819 |
| 4,604,628 | A | | 8/1986 | Cox | 343/818 |
| 5,061,944 | A | | 10/1991 | Powers et al. | 343/795 |
| 5,189,435 | A | * | 2/1993 | Yarsunas et al. | 343/903 |
| 5,220,341 | A | * | 6/1993 | Yamazaki | 343/901 |
| 5,841,406 | A | | 11/1998 | Smith | 343/815 |
| 5,865,390 | A | | 2/1999 | Iveges | 242/375 |
| 5,995,061 | A | | 11/1999 | Schiller | 343/815 |
| 6,107,969 | A | * | 8/2000 | Gulino et al. | 343/702 |
| 6,154,180 | A | | 11/2000 | Padrick | 343/722 |
| 6,300,912 | B1 | | 10/2001 | Pla | 343/713 |

OTHER PUBLICATIONS

Gibson, William, "A Teletuned 10–Meter Beam", QST, Cover Page and p. 35, Aug. 1952.
Advertisement for "Cliff–Dweller" by New–Tronics, Model CD 40–75, QST, p. 138, Dec. 1964.
Advertisement for New–Tronics Cliff–Dweller™, QST, p. 109, date unknown.

* cited by examiner

*Primary Examiner*—Tan Ho
(74) *Attorney, Agent, or Firm*—Lewis and Roca LLP

(57) ABSTRACT

An antenna system with at least one tunable dipole element with a length adjustable conductive member disposed therein that enables the antenna to be used over a wide range of frequencies. The element is made of two longitudinally aligned, hollow support arms made of non-conductive material. Disposed longitudinally inside each element is a length adjustable conductive member electrically connected at one end. In the preferred embodiment, each conductive member is stored on a spool that is selectively rotated to precisely extend the conductive member into the support arm. The support arms, which may be fixed or adjustable in length, are affixed at one end to a rigid housing. During use, the conductive members are adjusted in length to tune the element to a desired frequency. The antenna is especially advantageous when configured as a Yagi-style antenna that can be optimally tuned at a specific frequency for maximum gain, maximum front-to-back ratio, and to provide a desired feed point impedance at the driven element. The antenna can also function as a bi-directional antenna by adjusting the reflector element to function as a director. An electronic control system allows the length of the conductive members to be manually or automatically adjusted to a desired frequency.

141 Claims, 6 Drawing Sheets

TUNABLE ANTENNA SYSTEM

Matter enclosed in heavy brackets [ ] appears in the original patent but forms no part of this reissue specification; matter printed in italics indicates the additions made by reissue.

This is a utility patent application based on the provisional patent application (Ser. No. 60/291,299) filed on May 15, 2001.

BACKGROUND OF THE INVENTION

1. Field of the Invention

The present invention relates to the field of radio antennas, and more particularly, to wide frequency coverage vertical, dipole and parasitic array antennas.

2. Description of the Related Art

It is often desired to provide a single antenna having excellent performance over a wide frequency range. In the interest of efficiency and impedance matching, antennas used for radio communication are generally resonant antennas. Unfortunately, resonant antennas by their nature operate over a very narrow range of frequencies. To be resonant at a specific frequency, the antenna must be a certain specific length.

Three commonly used resonant antennas are the dipole, vertical and Yagi-Uda. A dipole antenna is comprised of a single element, usually one half of a wavelength long at the design frequency. It is then usually split at the center where electromagnetic energy is then fed. Vertical antennas are basically dipoles oriented in a vertical plane with one half of the element being driven and the other half removed. The earth is then used as a conductor in its place. Yagi-Uda antennas, frequently referred to as parasitic arrays, are known in the art to provide directional transmission and reception with a high front-to-back ratio as well a low VSWR throughout a very narrow band of contiguous frequencies. Most embodiments of a Yagi-Uda antenna use a single element that is driven from a source of electromagnetic energy. Arrayed with the driven single element are the so-called reflector and director elements that are not driven directly, known as parasitic elements. There is usually only one reflector and one or more directors, with the favored direction of transmitting and reception towards the director elements.

The Yagi-Uda antenna is basically a single frequency device that can be designed to work satisfactorily over a few percent of the center design frequency. However, tradeoffs must be made between gain, front-to-back ratio, and VSWR to allow the antenna to work over this very narrow 3%–4% range. It is often desirable to have a single Yagi-Uda antenna operate in multiple frequency bands. Many radio services have assigned frequencies segregated into bands scattered through the radio spectrum. The amateur radio service is a good example of this, having bands approximately centered at 160M, 80M, 40M, 30M, 20M, 17M, 15M, 12M, 10M, 6M, 2M, etc. Radio amateurs commonly use Yagi-Uda arrays in the 40 m and higher bands. Some prior art antenna designs address multiple bands that cover three of the aforementioned bands, and in some cases five bands, but with very compromised performance. To provide even marginal performance, these antenna designs require large and complex arrays.

To enable wider frequency coverage, three methods have been classically employed. A common method is the use of "traps" that allow one element to function on three bands. Traps are parallel-resonant circuits placed at specific locations on the element to decouple a portion of the element automatically as the antenna operation is changed from band to band. Although multi-element trapped antennas cover multiple frequencies with fewer elements than others designs, they cannot be optimally tuned and there are significant losses associated with traps in all of the elements including the driven element. A trapped Yagi-Uda antenna is a significant compromise in gain, front-to-back ratio, and overall efficiency.

Another method to obtain wider frequency coverage is the use of a so-called log-periodic antenna, in which every element is driven and no element is parasitically driven. This type of antenna can operate over a range of frequencies having a ratio of 2:1 or higher. The antenna impedance varies logarithmically so the VSWR can range as high as 2:1. The log-periodic antenna trades off wide bandwidth for gain and front-to-back ratio. The log-periodic antenna has less gain and less front-to-back ratio than a three element monoband Yagi-Uda antenna yet requires many more elements and a complex feed system.

Yet another method of obtaining wider frequency coverage is the use of an open-sleeve cell type of driven element. This method uses one or more parasitically excited elements placed very close to the driven element. The length of these parasitic elements is usually half that of the driven element. This method results in a wider VSWR bandwidth and the ability to operate on two different frequencies with a single feedline. However, the open-sleeve technique only applies to a driven element. Yagi-Uda antennas require additional dedicated parasitic elements for each anticipated frequency band.

SUMMARY OF THE INVENTION

It is an object of the present invention to provide a tunable antenna system with at least one driven element that can be selectively adjusted in length to receive and transmit different frequencies.

It is another object of the present invention to provide such an antenna system that can be used with parasitic elements.

It is a further object of the present invention to provide such an antenna system that is easy to assemble and dismantle.

Disclosed herein is an antenna system comprising of an antenna with at least one driven element made up of two longitudinally aligned support arms joined at their proximal ends to a rigid housing unit affixed or mounted to a boom or support pole. Disposed inside the two support arms are two length adjustable conductive members that are electrically separated to form a dipole or connected together to form a parasitic element. Disposed inside the housing unit is a means for adjusting the length of the two conductive members inside the support arms. In the preferred embodiment, the means for adjusting the length of the conductive members are two spools located inside the housing unit in which the conductive members are wound. During use, one conductive member is associated with one support arm and is selectively wound and unwound from a spool so that the conductive member moves longitudinally inside the support arm. At least one motor is provided inside the housing unit that rotates the spools to precisely control the length of the conductive members inside the support arms. In one embodiment, the support arms are rigid and fixed in length. In a second embodiment, the support arms are telescopic and capable of being adjusted in length.

The antenna system also includes a radio system that is connected to the driven element on the antenna. The antenna system may have one or more parasitic elements. The system also includes an electronic control unit that controls the length of the conductive member in each element on the antenna which allows the operator to select a desired frequency, read the operating frequency of the radio, adjust the antenna manually or automatically or measure the transmit frequency with a frequency counter, and then adjust the antenna automatically. In a second embodiment, both support arms are telescopic and adjustable in length. The distal ends of the conductive members are attached to the distal ends of the support arms so that the overall size of the antenna may be adjusted when a desired frequency is received.

The above antenna system is especially advantageous when configured as a Yagi-style antenna that can be optimally tuned at a specific frequency for maximum gain, maximum front-to-back ratio, and to provide a desired feed point impedance at the driven element. This allows a very large continuous range of frequencies to be covered with excellent performance and a very low voltage-standing-wave-ratio (VSWR) while using only one feed line. By using length adjustable elements and a shorter boom, the antenna system is able to achieve better performance than prior art antenna designs. Also incorporated into it is a Yagi-style antenna, enabling it to be quickly adjusted to change the direction of maximum signal strength 180 degrees by changing the length of the designated director to make it function as a reflector and conversely changing the length of the reflector to make it function as a director. In should also be understood that the antenna system can also function as a bi-directional style antenna by adjusting the reflector element to function as a director.

An electronic control system is provided that manually or automatically adjusts the length of the conductive members inside the antenna driven and parasitic elements to receive or transmit a desired frequency.

DESCRIPTION OF THE PREFERRED EMBODIMENT(S)

Prior art designs have employed many different methods in the quest to design wide frequency coverage radio antennas. The goal of the present invention is to provide an antenna system 10 that uses an antenna 11 with at least one driven element 12 with optimal gain, VSWR, and front-to-back ratio. Although the antenna 11 will be described in the preferred embodiment as a high frequency Yagi array having three elements 12, 12', 12", it is understood that the invention is not limited to a Yagi array. It should also be understood that the while the antenna 11 is shown with one centrally located driven element 12 and two non-driven or parasitic elements 12', 12", the antenna 11 is not limited to this arrangement and can be expanded to more than one driven element and more than one or two parasitic elements to operate on other frequencies.

Figure 1:
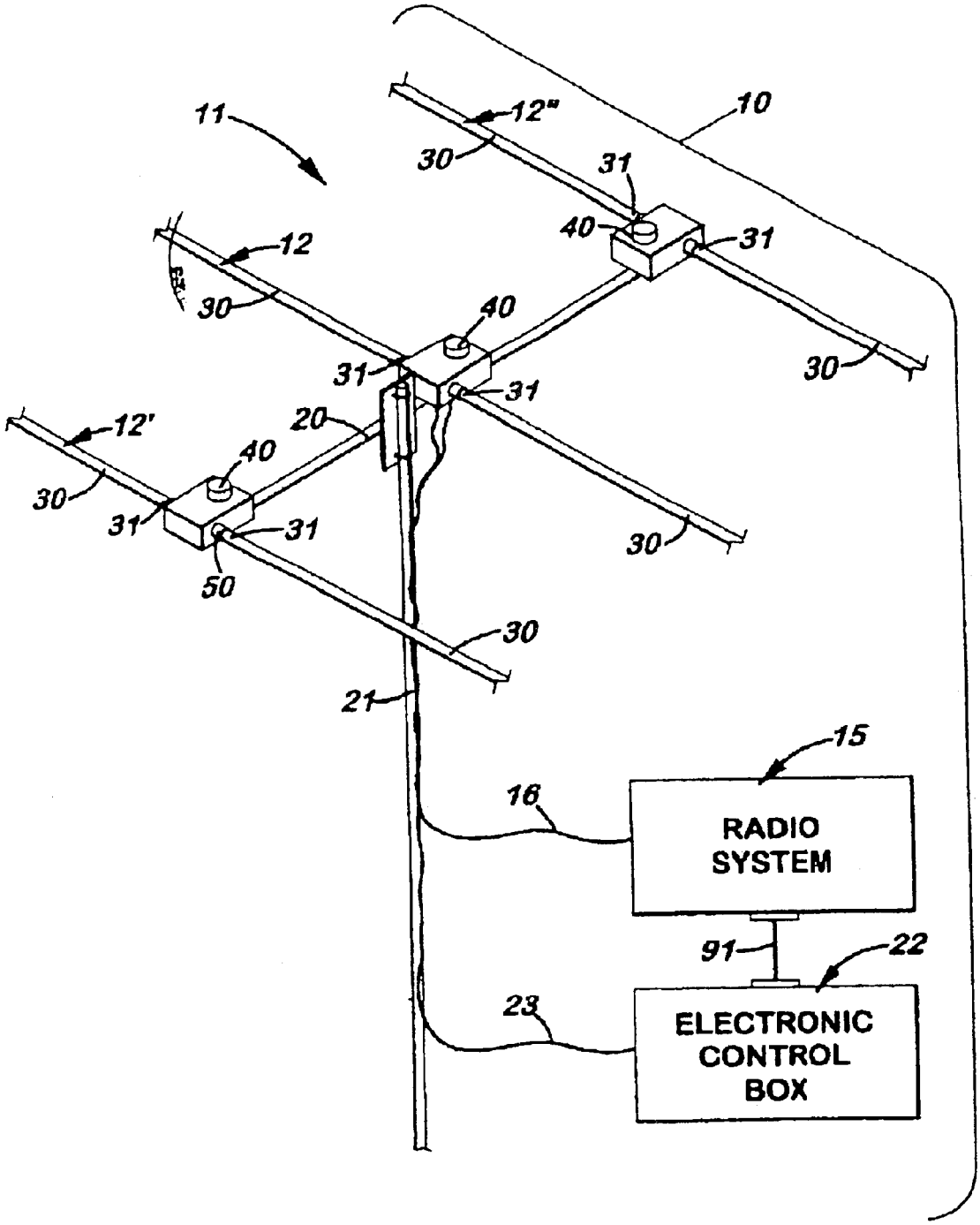
FIG. 1 is perspective view of the antenna system with at least one tunable dipole element.

FIG. 1 shows a perspective view of the antenna 11 designed to operate from 14 MHz (20 meters) to 54 MHz (6 meters) that includes three dynamically adjustable elements 12, 12', 12'. All three of the elements 12, 12', 12" are adjustable in length, but only the center element 12 is driven while the remaining two elements 12', 12" are parasitically excited. As described further below, the elements 12, 12', 12" are dipoles exactly 36 feet in length and attached at their center axis to a boom 20. Each element 12, 12', 12" is made of two hollow, longitudinally aligned support arms 30 made of lightweight, non-conductive material. The two support arms 30 are attached at their proximal ends 31 to a receiver 50 (shown more clearly in FIGS. 2 and 3) mounted to the sides of a housing unit 40 making the total length of the elements 12, 12', 12" thirty-six feet which is just long enough to accommodate the longest anticipated element, a twenty meter reflector. The boom 20 is mounted to a vertical support pole 21.

In the embodiment shown in FIG. 1 that uses three elements 12, 12', 12", the boom 20 is sixteen feet in length thus making it 0.23 wavelengths on twenty meters and 0.46 wavelengths on ten meters. The length of the boom 20 was carefully chosen to provide optimum performance at the highest and lowest frequencies of operation. Analysis has shown that excellent gain and front-to-back ratio can be achieved on frequencies ranging from twenty meters to ten meters using a sixteen-foot boom 20. As boom lengths get very short, near 0.1 wavelength, the gain and front-to-back ratio drops significantly, and antenna impedance becomes undesirably low as well. At around 0.6 wavelengths the front-to-back ratio declines rapidly but the gain remains near its maximum theoretical limit. Yagi antennas exhibit a wider bandwidth and slightly higher gain when implemented on longer booms. It is generally accepted that approximately 0.3 wavelengths is the ideal length for a monoband beam because it makes it easier to achieve reasonable gain and front-to-back ratio across a 3% to 4% wide frequency band. In the present invention, the ability to tune the elements 12, 12', 12" without regard to bandwidth substantially negates the compromise of fixed element spacing when compared to a monoband Yagi. At 6 meters the boom 20 is approaching 0.9 wavelengths long reducing the front-to-back ratio to a very low value. However, the antenna 11 will still exhibit around six dBs of forward gain. When one parasitic six meter element is placed between the driven element 12 and one of the parasitic elements 12', a four element 6 meter Yagi is created with optimum spacing. The interaction between the 6 meter elements and the other elements is negligible because they are so far removed in frequency. By using dedicated parasitic elements for the higher frequencies, antenna operation can be extended to 2 meters.

Figure 2:
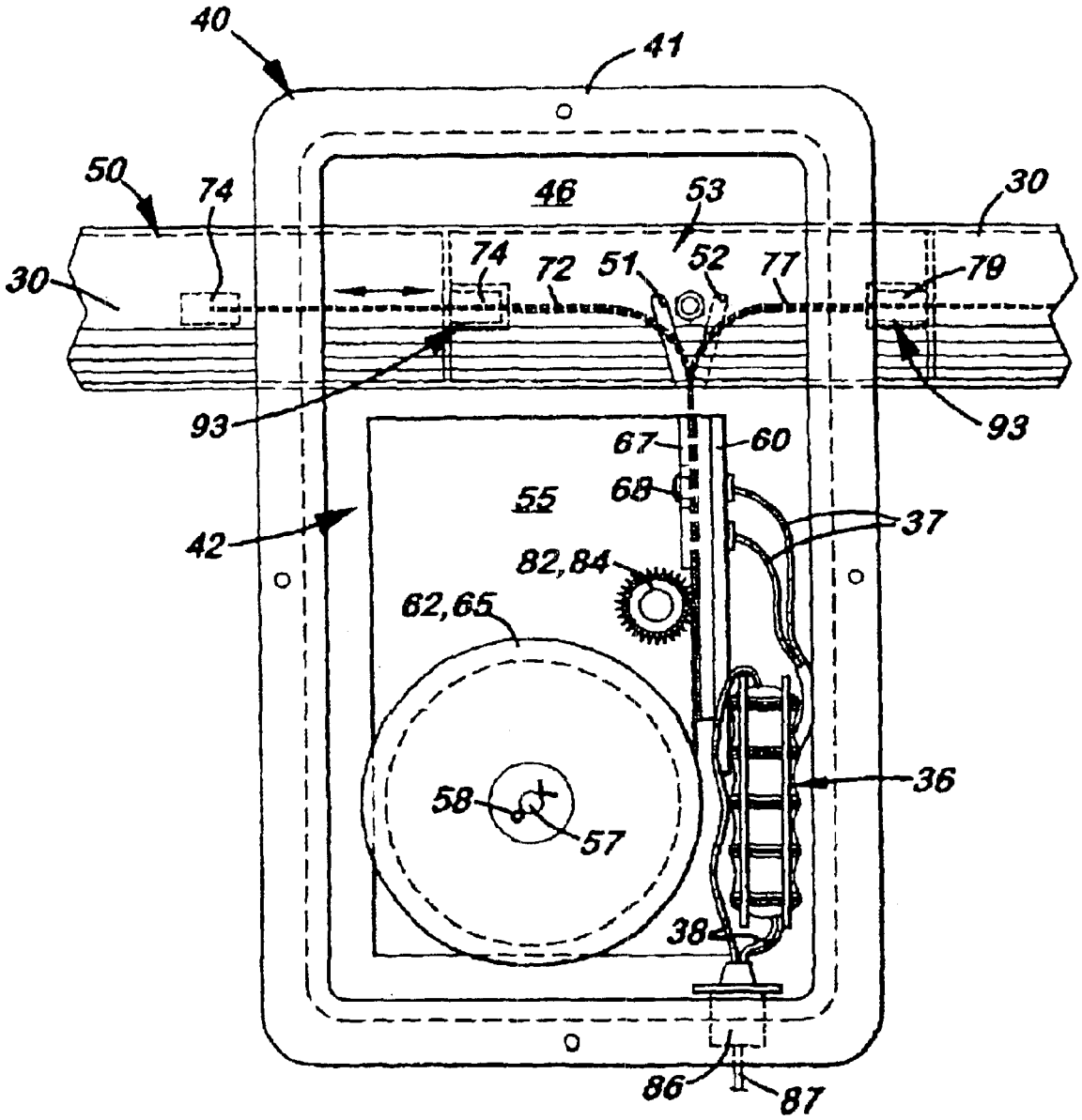
FIG. 2 is a bottom plan view of the housing unit.
Figure 3:
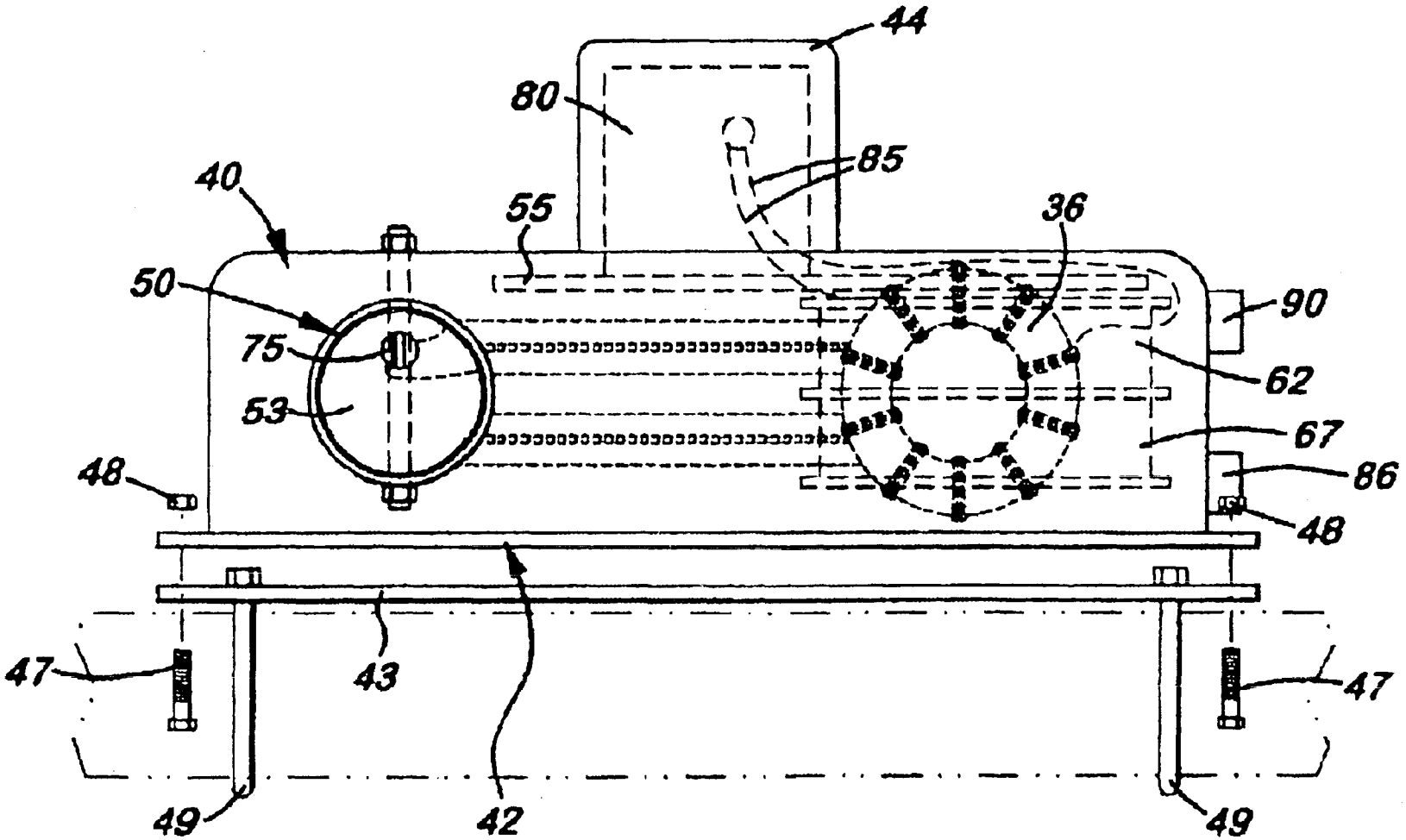
FIG. 3 is a side elevation view of the housing unit.

As mentioned above, each element 12, 12', 12" is attached to a housing unit 40 that attaches to the boom 20 via a pole clamp 49, as shown in FIG. 3. As shown in FIG. 2, the housing unit 40 includes an upper enclosure 41 with a lower opening 42 formed thereon. Attached via suitable bolts 47 and nuts 48 to the lower opening 42 is a flat lid 43. Formed inside the housing unit 40 is a central cavity 46 in which a main support plate 55 and ancillary support plate 60 are disposed. Extending transversely through the central cavity 46 is an element receiver 50 used to connect the proximal ends 31 of the support arms 30 to the housing unit 40. In the preferred embodiment, the element receiver 50 is a pipe made of non-conductive material, such as fiberglass, that extends transversely through holes (not shown) formed on the sides of the housing unit 40.

Figure 4:
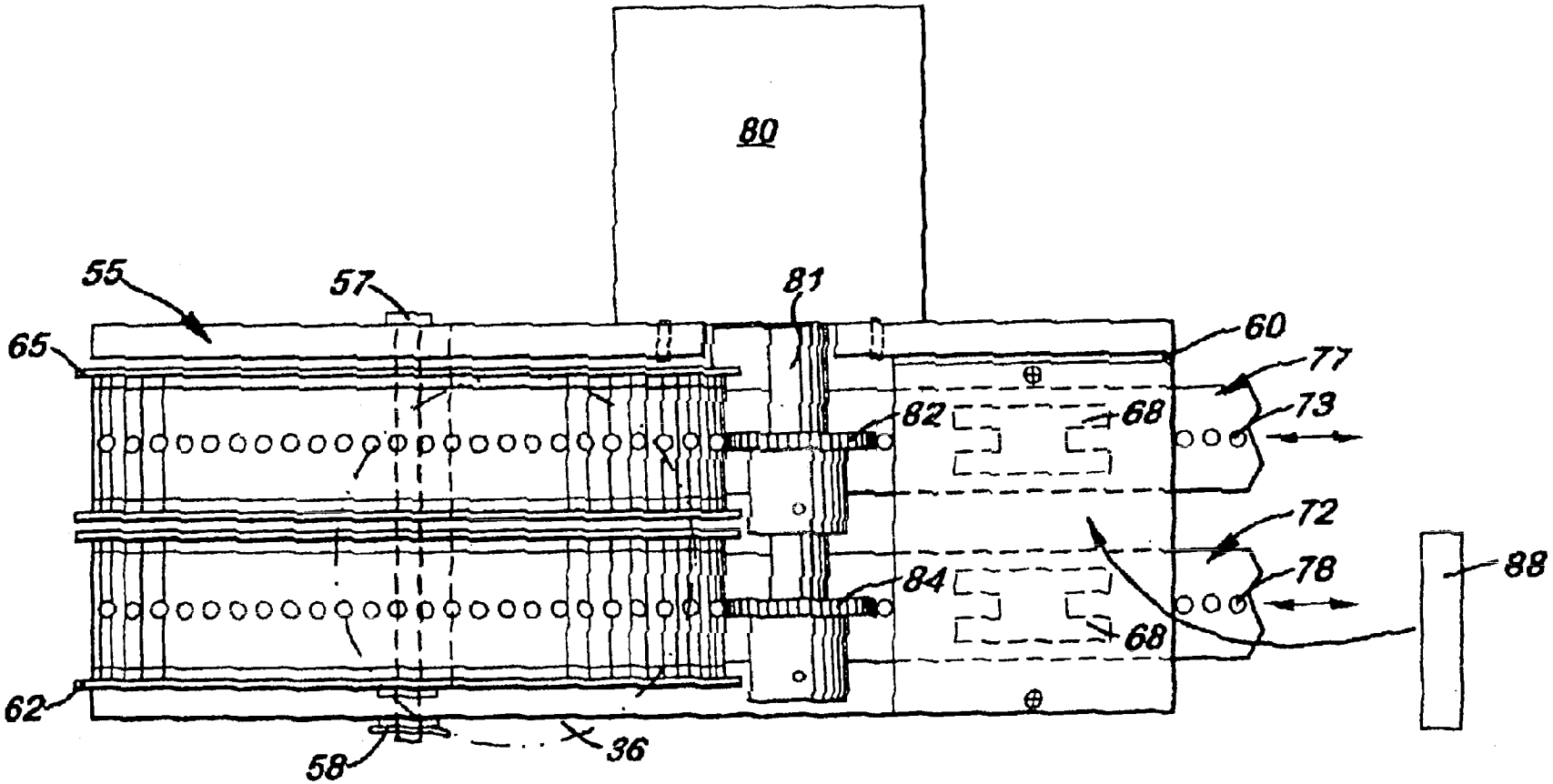
FIG. 4 is a side elevation view of the two conductive members wound onto two spools mounted on a frame member and a stepper motor connected to the frame member with sprockets that enable holes formed on the conductive members that are engaged by teeth formed on two sprockets.
Figure 5:
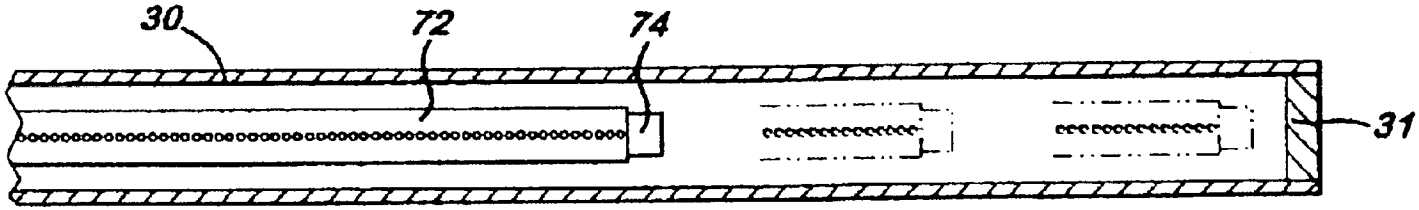
FIG. 5 is a sectional side elevation view of a fixed element with a conductive members moving longitudinally therein.

As shown in FIGS. 2–4, the main support plate 55 is longitudinally aligned inside the housing unit 40. Mounted perpendicularly on the front surface of the main support plate 55 adjacent to one edge is the ancillary support plate 60. Mounted on the lower section of the main support plate 55 is an axle 57 over which two reels 62, 65 are mounted. Both reels 62, 65 have a conductive member 72, 77 continuously wound thereon which rotate freely around the axle 57. A cotter pin 58 is used to hold the reels 62, 65 on the axle 57. The reels 62, 65 include an integral spring (not shown) that insures the conductive members 72, 77 wind tightly back onto the reels 62, 65.

Mounted on the back surface of the main support plate 55 and slightly above the two reels 62, 65 is a stepper motor 80. The housing unit 40 includes a cylindrical neck 44 that accommodates the stepper motor 80 when the main support plate 55 is placed inside the housing unit 40. The drive shaft 81 of the stepper motor 80 extends through the main support plate 55. Fixed to the drive shaft 81 are two sprockets 82, 84 that engage holes 73, 78 formed on the conductive members 72, 77. The conductor members 72, 77 are wound and unwound from the reels 62, 65 by two sprockets 82, 84, respectively, connected to the drive shaft 81 of a stepper motor 80.

The ancillary support plate 60 includes a guide plate 67 attached to its inside surface under which the conductive members 72, 77 slide when unwound from the reels 62, 65, respectively. As shown in FIG. 2, the inside surface of the ancillary support plate 60 is aligned tangentially with the outer surface of the reels 62, 65 so that conductive members 72, 77 unwind and wind freely from the reels 62, 65.

On the driven element 12, a balun 36 is mounted on the outside surface of the ancillary support plate 60. The balun 36 is connected via braided wires 37 to a pair of flat brushes 68 mounted into recessed openings (not shown)formed on the upper section of the ancillary support plate 60. The brushes 68 are made of a conductive spring material that maintains positive electrical contact with the conductive members 72, 77. Suitable copper wires 38 are connected at one end to the balun 36 and connected at their opposite ends to a coaxial female plug connector 86 mounted on the side of the housing unit 40. The female plug connector 86 includes a center element 87 (driven element) to allow transfer of electromagnetic energy to and from the radio system 15. As shown in FIG. 3, suitable wires 85 are connected at one end to the stepper motor 80 and at their opposite ends to a second plug connector 90 which is also mounted on the sides of the housing unit 40.

On the driven element 12, the radio system 15 is connected via a coaxial cable 16 to the female plug connector 86 mounted on the housing unit 40. The electronic control box 22 is connected via a control cable 23 to the second plug connector 90 mounted to the sides of the housing unit 40.

The conductive members 72, 77 range from 0.1 inch to 1 inch in width and from 0.004 inch to 0.025 inch in thickness. They can be made of any conductive material that lends itself to winding up on a reel reliably. In the preferred embodiment, the conductive members 72, 77 are made of copper beryllium and are 0.550 inch wide and 0.008 inch thick and have holes 73, 78, respectively, punched in them along their entire length to match the pitch of the sprockets 82 and 84.

In the driven element 12, the brushes 68 connect to a balun 36 that provides conversion between the balanced impedance of the dipole and the unbalanced impedance of the coaxial cable 16 that connects the radio system 15 to the driven element 12. The conductive members 72, 77 then exit the ancillary support plate 60 platen and make a smooth 90-degree turn into an intermediate diverter 53 mounted centrally inside the receiver 50. Attached to the distal end of each conductive members 72, 77 are bullet shaped end caps 74, 79, respectively, that allow the conductive members 72, 77 to slide smoothly inside the support arms 30. The end caps 74, 79 also fit into recessed openings 75 formed on the ends of the intermediate diverter 53 and act as positive stops when the conductive members 72, 77 are fully retracted and thus serve as calibration stops that establish a known starting length for the element.

As stated above and shown in FIGS. 2 and 3, the balun 36 is connected to the female plug connector 86. The balun 36 converts the unbalanced coaxial cable 16 to the balanced antenna element when the element 12 is used as a standalone dipole. However, a Yagi antenna presents a much lower input impedance (5 to 30 ohms) to the radio system than does a dipole thus making a poor match to commonly used 50 ohm coaxial cable. To match the low impedance Yagi to the higher impedance of practical coaxial cables a matching system is required. Several methods are used in prior art designs such as the gamma match, beta match, delta match, L-section match, and matching stubs. All of these matching systems are frequency-dependent making them generally unsuitable for wide frequency Yagi antennas. The exception is the L-section match that uses the antenna element as one component (capacitive) of an L-section matching network with the other being an inductor placed across the antenna feedpoint. This method would normally only work on a single band because the inductor is a fixed value as is the driven element length, thus fixing the capacitor value of the element. However, the ability to alter the driven element makes the L-section variable and when coupled with a judiciously chosen inductor value can match a Yagi over approximately a two to one frequency range. Broadband baluns have been used to transform impedances and convert unbalanced to balanced loads simultaneously over a 10 to 1 frequency range. The problem with this approach is that classic baluns cannot be made to transformer a 20 ohm impedance to 50 ohms, as required by a typical Yagi. They work well for transforming 50 ohm impedances to higher values, specifically 200 ohms (4:1), 300 ohms (6:1), and 450 ohms (9:1). It is possible to make a 1:4 balun that converts 12 ohms to 50 ohms but 12 ohms is unacceptably low for matching a Yagi. Unlike baluns, a device called a "unun" (unbalanced to unbalanced) can transform low impedances to higher impedances at a variety of ratios; however, the unun only works with unbalanced loads. The solution is to place a 1:1 balun between the unun and the coaxial cable.

In the preferred embodiment, the problem is solved by using a unun transmission line transformer wound to convert 20 ohms to 50 ohms on the same toroidal core with a 1:1 balun 36, thus transforming the impedance and converting the unbalanced load over a wide frequency range. The balun 36 can be constructed to operate from 20 meters to 2 meters thus allowing the present invention to operate over the same range if dedicated elements 12, 12' 12" are installed for 6 meters and 2 meters.

In FIGS. 2–4, the housing unit 40 for a driven element 12 is shown. The housing units 40 used on the passive elements 12', 12" contain the same components except the balun 36 and the female plug connector 86. The passive elements 12', 12" simply have a shorting strip 88 across the two brushes 68 thus forming one continuous element 12, as shown in FIG. 4.

In the preferred embodiment, the stepper motor 80 is controlled via a twelve-conductor control cable 23 connected to the electronic control box 22. The electronic control box 22 contains all of the electronics and software programs 29 used to drive the stepper motor 80 and provide an interface to the human operator which may include a display 24 or a keyboard/LED peripheral component 26. The stepper motor drivers 83, 83', 83" are located on the motherboard 27 located inside the electronic control box 22. A keyboard/LED peripheral component 26 may also be attached to the electronic control box 22. The electronic control box 22 may also include a second cable 91 that connects to a suitable interface on the radio system 15 allowing automatic adjustment of the antenna 10 based on the transceiver frequency setting.

Figure 8:
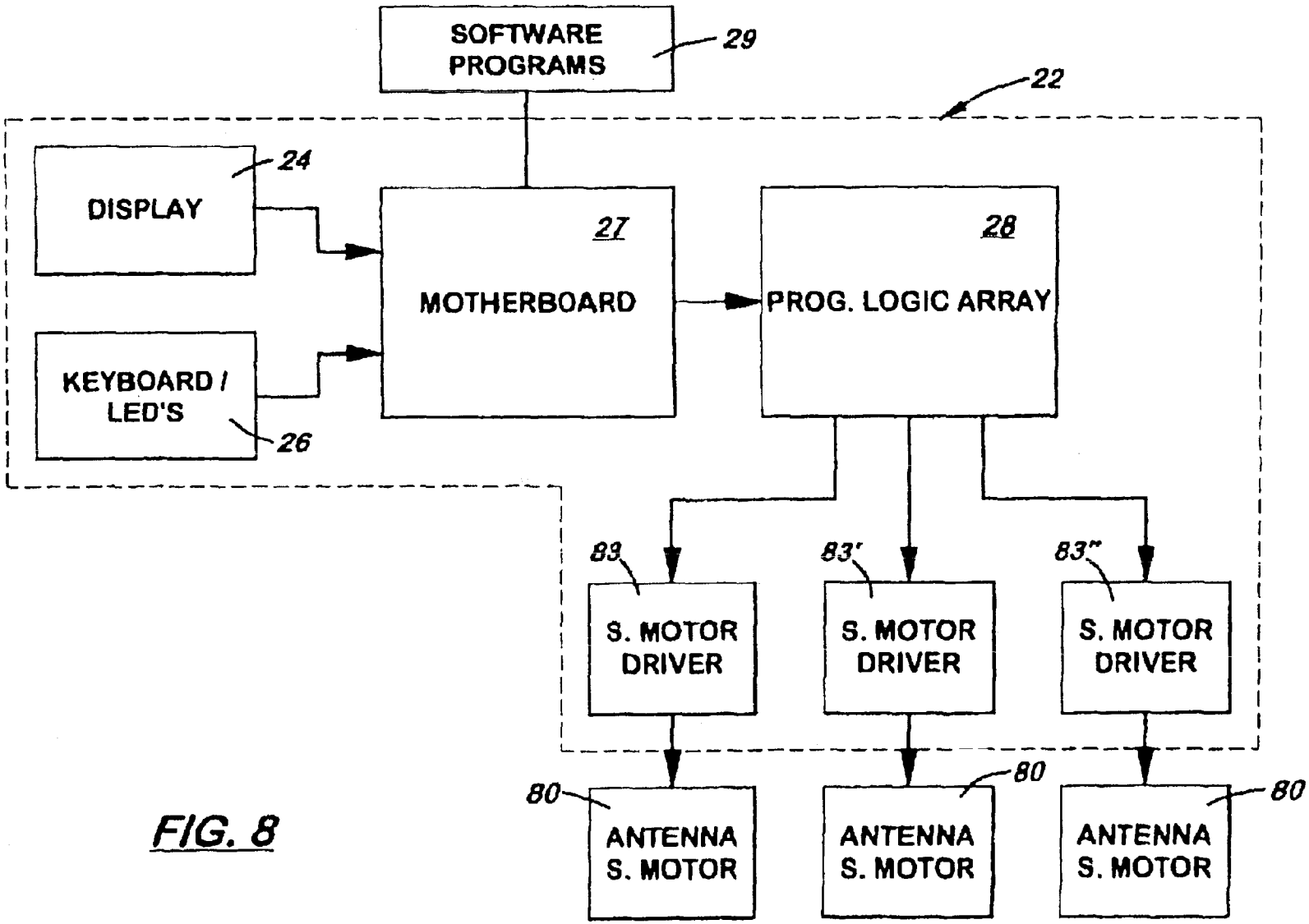
FIG. 8 is a block diagram of the antenna system.

FIG. 8 is a block diagram of the antenna system 10. The motherboard 27 with programmable logic array 28, under the direction of the software program 29, controls the operation of all three elements 12, 12', 12" simultaneously via stepper motor drivers 83, 83', 83", respectively. The display 24 indicates various operating parameters such as current frequency, mode, warning messages, setup data for RS-232 communications, antenna creation data, and calibration data. The keyboard/LED component 26 allows the human operator to change bands, change modes, create and save antennas, and perform calibrations. The keyboard/LED peripheral component 26 provides indications of various functions such as band indication, mode selection, and sundry functions. The software program 29 either calculates the required lengths of antenna elements 12, 12', 12" from formulas or uses lookup tables depending on the mode of operation. The user can also customize the antenna 11 to satisfy specific requirements and then save it for quick recall. In the first embodiment, the elements 12, 12', 12" are fixed, elongated hollow support arms 30 that are circular in cross-section, approximately 1½ inches in diameter (O.D.), and 18 feet in length. The support arms 30 are made of fiberglass. As stated above, the proximal end 31 of each support arm 30 is inserted into the end of a cylindrical shaped receiver 50 that extends transversely through the front section of the housing unit 40. The support arm 30 is approximately 1½ inches in diameter (O.D.) and fits snuggly into the receiver 50. A suitable bolt and nuts (not shown) are used to attach the receiver 50 to the housing unit 40. Formed on the receiver 50 are curved slots 51, 52 through which the conductive members 72, 77 extend to enter the support arms 30. One conductive member 72 enters one support arm 30 while the other conductive member 77 enters the opposite support arm 30. Located inside the receiver 50 is the non-conducting intermediate diverter 53 with two opposite curved slots (not shown) formed therein that are aligned and registered with slots 51, 52. Formed on the outer end surface of the diverter 53 is a recessed opening 93 which receives the end cap 74 attached to the tip of the conductive member 72, 77.

Figure 6:
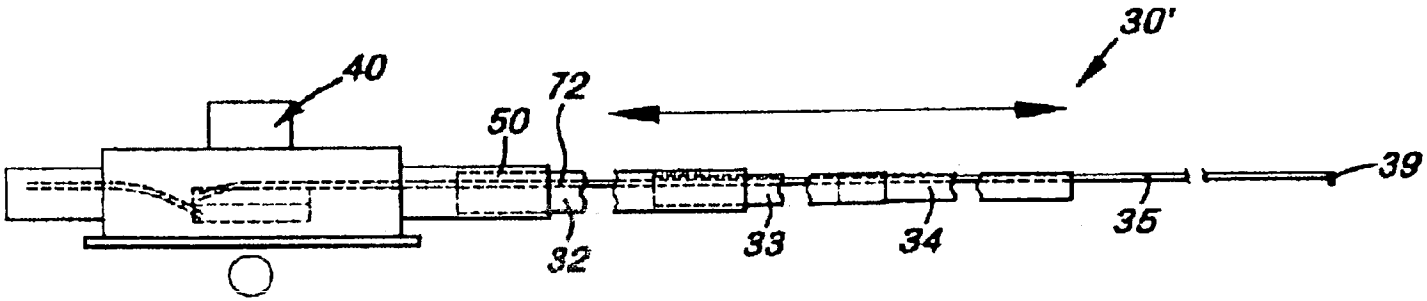
FIG. 6 is a side elevation view of a length adjustable element.
Figure 7:
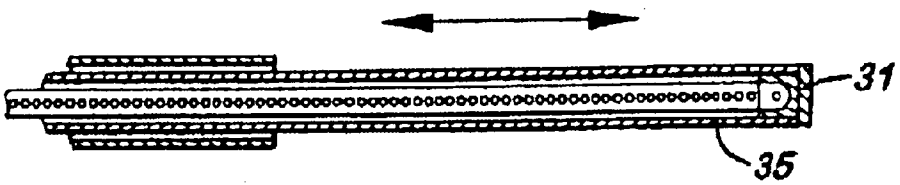
FIG. 7 is a sectional side elevation view of the element shown in FIG. 6 showing the distal end of the conductive member attached to a non-conductive plug placed into the distal end of the element.

In a second embodiment, shown in FIG. 6, the support arms 30 are telescopically designed to adjust in length to the length of the conductive member 72, 77. In the preferred embodiment, there are four 4-foot sections 32–35, each slightly smaller than the other so that the sections 32–35 may be longitudinally aligned and telescopically adjusted in length. Attached to the distal end of the last section 35 is a non-conductive cap 39 that attaches to the distal end of the conductive member 72 (shown) or 77 (not shown). When the conductive member 72, 77 is moved inside the support arm 30, the sections 32–35 telescopically move so that the overall length of the support arm 30 is approximately equal to the length of the conductive member 72, 77.

During operation, the operator may use the electronic control unit 22 to perform some of the following functions:

1. Single button band selection includes the ability to scroll through the band in segments of approximately 100 kHz.
2. Continuous adjustment of the antenna 11 over its entire frequency range using simple up/down buttons (not shown).
3. Adjustment of the antenna 11 by sensing the VSWR.
4. 180-degree direction change (Yagi version only) by changing the director to a reflector and changing the reflector to a director via a single button control, thus allowing very fast (less than 2 seconds) direction changes.
5. Bi-directional operation (Yagi only) is possible by making both parasitic elements 12', 12" directors or use only one parasitic element 12 to implement a two element Yagi tuned to operate bi-directionally.
6. Store different antenna designs in the microprocessor memory that maximize gain only, front-to-back ratio only, or VSWR only.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A tunable antenna system, comprising:

a. at least one driven element, said element comprising two longitudinally aligned support arms made of non-conductive material, each said support arm including a length adjustable conductive member longitudinally aligned therein;

b. means for adjusting the length of said conductive member in each said support arm;

c. a radio transmitter/receiver coupled to said driven element; and, d. means to coordinate the means for adjusting the length of said conductive members to receive a desired frequency used by said radio transmitter/receiver.

2. The tunable antenna system, as recited in claim 1, wherein said means for adjusting the length of said conductive members is a spool upon which each said conductive member is wound, and at least one motor to selectively wind and unwind said conductive members from said spools to form a dipole element used to receive a desired frequency.

3. The tunable antenna system, as recited in claim 2, wherein said means to coordinate said means to control the length of said conductive members is a programmable electronic control unit coupled to said motor to precisely control the length of said conductive members used in each said element.

4. The tunable antenna system, as recite*d* in claim 2, wherein said motor is two directional and includes a drive shaft with at least one sprocket that engages said conductive member, whereby when said motor is activated, said sprocket winds or unwinds said conductive member from said [reel] *spool*.

5. The tunable antenna system, as recited in claim 1, further including at least one non-driven element comprising two longitudinally aligned support arms made of non-conductive material, each said support arm including a length adjustable conductive member and means for adjusting the length of said conductive member.

6. The tunable antenna system, as recited in claim 5, wherein said driven element and said non-driven element are attached to a boom and spaced about eight feet.

7. The tunable antenna system, as recited in claim 5, further including a second non-driven element aligned parallel to said driven element and opposite to said non-driven element.

8. The tunable antenna system, as recited in claim 1, wherein said conductive member is 0.1 to 1 inch wide and 0.004 to 0.025 inch thick.

9. The tunable antenna system, as recited in claim 8, wherein each said support arm is eighteen feet in length and said conductive member is able to extend the full length thereof.

10. The tunable antenna system, as recited in claim 1, further including a housing unit with means to mount said support arms in a longitudinally aligned position on opposite sides of said housing unit.

11. The tunable antenna system, as recited in claim 10, wherein said means to mount said support arms is a transversely aligned rigid pipe attached to said housing unit, said pipe including opposite open ends that slidingly receives said support arms.

12. The tunable antenna system, as recited in claim 11, further including said rigid pipe, including a pair of slots that receive a pair of conductive members and transmits said conductive members in opposite directions through said receiver.

13. The tunable antenna system, as recited in claim 12, further including an end cap attached to the exposed end of said conductive member enabling said end caps to slide freely inside said support arm.

14. The tunable antenna system, as recited in claim 1, wherein said support arms include a plurality of sections longitudinally aligned and telescopingly interconnected so that said support arms may be adjusted in length.

15. The tunable antenna system, as recited in claim 14, further including means to couple the length of said conductive member to the length of said support arms.

16. A tunable antenna system, comprising:

a. at least one element comprising two longitudinally aligned support arms made of non-conductive material;

b. two conductive members, each wound on a reel, said conductive members being longitudinally aligned in opposite inside said support arms, said conductive members being adjusted in length in said support arms by selectively winding and unwinding said conductive members from said reels;

c. a stepper motor coupled to said reels to precisely control the rotation of said reels;

d. a radio transmitter/receiver coupled to at least one element; and, e. means to coordinate the means for adjusting the length of said conductive members to receive a desired frequency used by said radio transmitter/receiver.

17. The tunable antenna system, as recited in claim 16, wherein said means to coordinate said means to control the length of said boom and means to control the length of said conductive material is a programmable electronic control unit coupled to said stepper motor which is able to precisely control the length of said conductive members used in each said element to receive or transmit as a desired frequency.

18. The tunable antenna system, as recited in claim 17, further including a housing unit with means to mount said support arms in a longitudinally aligned position on opposite sides of said housing unit.

19. The tunable antenna system, as recited in claim 18, wherein said means to mount said support arms is a transversely aligned rigid pipe open at its open ends that slidingly receives said support arms.

20. The tunable antenna system, as recited in claim 17, further including at least one non-driven element comprising two longitudinally aligned support arms made of non-conductive material, each said support arm including a length adjustable conductive member coupled to said electronic control unit.

*21. A tunable antenna system, comprising:*

*a driven element, said driven element comprising a first support arm formed from non-conductive material, said first support arm being hollow and including a first length-adjustable conductive member disposed therein, and a second support arm formed from non-conductive material, said second support arm being hollow and including a second length-adjustable conductive member disposed therein;*

*a length-adjuster configured to adjust the lengths of said first and second conductive members disposed, respectively, in said first and second support arms; and*

*a transmission-line coupler electrically coupled to said driven element.*

*22. The tunable antenna system of claim 21, further including a controller, coupled to said length adjuster, for causing said length adjuster to adjust the length of said conductive member in said driven element to resonate at a desired frequency.*

*23. The tunable antenna system of claim 21, wherein said length-adjuster is disposed in a housing that mechanically supports said first and second support arms.*

*24. The tunable antenna system of claim 23, wherein said first and second support arms are substantially straight and extend in opposite directions from the housing.*

*25. The tunable antenna system of claim 23, wherein:*

*each of said first and second conductive members is wound on a spool; and*

*said length-adjuster includes at least one motor coupled to said first and second conductive members and driven by said controller to selectively wind and unwind said first conductive member from its spool and into and out of said first support arm and to selectively wind and unwind said second conductive member from its spool and into and out of said second support arm to form an adjustable-frequency dipole element.*

*26. The tunable antenna system of claim 25, wherein said transmission-line coupler disposed in said housing and in electrical contact with said first and second conductive members at a position proximate to their spools.*

*27. The tunable antenna system of claim 25, wherein said controller includes a programmable microprocessor or microcontroller coupled to said motor to precisely control the length of said first and second conductive members.*

*28. The tunable antenna system of claim 25, wherein:*

*each of said first and second conductive members is formed as a flat strip including a series of spaced-apart holes formed along a lengthwise axis thereof;*

*said at least one motor is a bi-directional motor and is mechanically coupled to a sprocketed wheel mounted on a drive shaft, sprockets on said wheel engaging said series of spaced-apart holes, whereby when said bi-directional motor is activated, said sprocketed wheel winds and unwinds each of said first and second conductive members from its spool into and out of its support arm.*

*29. The tunable antenna system of claim 21, wherein each of said first and second support arms comprises a plurality of nested telescoping tube sections formed from said non-conductive material.*

*30. The tunable antenna system of claim 22, further including:*

*at least one non-driven element spaced apart from said driven element, said at least one non-driven element comprising a third support arm formed from non-conductive material, said third support arm being hollow and including a third conductive member disposed therein, said third conductive member being length-adjustable, and a fourth support arm formed from non-conductive material, said fourth support arm being hollow and including a fourth length-adjustable conductive member disposed therein, said fourth conductive member being length-adjustable; and*

*a length-adjuster coupled to said controller and configured to adjust the lengths of said third and fourth conductive members.*

*31. The tunable antenna system of claim 30, wherein said length-adjuster in each of said driven element and said non-driven elements is disposed in a housing that mechanically supports said support arms.*

*32. The tunable antenna system of claim 30, wherein:*

*said length-adjuster for said driven element is disposed in a first housing that mechanically supports said first and second support arms; and*

*said length-adjuster for said non-driven element is disposed in a second housing that mechanically supports said third and fourth support arms.*

*33. The tunable antenna system of claim 30, wherein:*

*said first and second support arms are substantially straight and extend in opposite directions from the first housing; and*

*said third and fourth support arms are substantially straight and extend in opposite directions from the second housing.*

*34. The tunable antenna system of claim 30, wherein:*

*each of said first and second conductive members is wound on a spool;*

*said length-adjuster for said driven element includes at least one first motor coupled to said first and second conductive members and driven by said controller to selectively wind and unwind said first conductive member from its spool and into and out of said first support arm and to selectively wind and unwind said second conductive member from its spool and into and out of said second support arm;*

*each of said third and fourth conductive members is wound on a spool;*

*said length-adjuster for said at least one non-driven element includes at least one second motor coupled to said third and fourth conductive members and driven by said controller to selectively wind and unwind said third conductive member from its spool and into and out of said third support arm and to selectively wind and unwind said fourth conductive member from its spool and into and out of said fourth support arm.*

*35. The tunable antenna system of claim 30, wherein said transmission-line coupler is disposed in said first housing and is in electrical contact with said first and second conductive members at a position proximate to their spools.*

*36. The tunable antenna system of claim 34, wherein said controller includes a programmable microprocessor or microcontroller coupled to said at least one first motor to precisely control the length of said first and second conductive members and coupled to said at least one second motor to precisely control the length of said third and fourth conductive members.*

*37. The tunable antenna system of claim 34, wherein:*

*each of said first and second conductive members is formed as a flat strip including a series of spaced-apart holes formed along a lengthwise axis thereof;*

*said at least one first motor is a bi-directional motor and is mechanically coupled to a first sprocketed wheel mounted on a drive shaft, sprockets on said first sprocketed wheel engaging said series of spaced-apart holes in said first and second conductive members, whereby when said at least one first motor is activated, said first sprocketed wheel winds and unwinds each of said first and second conductive members from its spool into and out of its support arm;*

*each of said third and fourth conductive members is formed as a flat strip including a series of spaced-apart holes formed along a lengthwise axis thereof;*

*said at least one second motor is a bi-directional motor and is mechanically coupled to a second sprocketed wheel mounted on a drive shaft, sprockets on said second sprocketed wheel engaging said series of spaced-apart holes in said third and fourth conductive members, whereby when said at least one second motor is activated, said second sprocketed wheel winds and unwinds each of said third and fourth conductive members from its spool into and out of its support arm.*

*38. The tunable antenna system of claim 30, wherein each of said first, second, third, and fourth support arms comprises a plurality of nested telescoping tube sections formed from said non-conductive material.*

*39. The tunable antenna system of claim 32, wherein the first and second housings are attached to a boom.*

*40. The tunable antenna system of claim 33, wherein at least two length-adjustable non-driven elements are spaced apart from and aligned parallel to said driven element.*

*41. The tunable antenna system of claim 33, wherein:*

*each of said first, and second support arms are mounted to said first housing by seating them inside an opposing pair of rigid pipes attached to said housings; and*

*each of said third, and fourth support arms are mounted to said second housing by seating them inside an opposing pair of rigid pipes attached to said housings.*

*42. The tunable antenna system of claim 33, wherein the free end of each said first, second, third, and fourth conductive members is fitted with a rounded-end tip enabling said conductive member to slide freely inside said support arm.*

*43. The tunable antenna system of claim 22, further including at least one fixed-length parasitic element spaced apart from said driven element, said fixed-length parasitic element having a length chosen to interact with said driven element to produce a desired azimuthal radiation pattern at a selected frequency.*

*44. The tunable antenna system of claim 30, further including at least one fixed-length parasitic element*

*attached to said boom and spaced apart from said driven element and said at least one non-driven element, said fixed-length parasitic element having a length chosen to interact with said driven element and said non-driven element to produce a desired azimuthal radiation pattern at a selected frequency.*

*45. The tunable antenna system of claim 30, wherein said controller includes a programmable microprocessor or microcontroller and is coupled to a non-volatile memory storing length data for said driven element and said at least one non-driven element.*

*46. The tunable antenna system of claim 45, wherein at least a portion of said length data corresponds to a plurality of selected antenna configurations.*

*47. The tunable antenna system of claim 30, wherein said controller includes a programmable microprocessor or microcontroller and is programmed to operate in a mode in which the individual lengths of said driven element and said at least one non-driven elements may be manually adjusted by a user to form a user antenna configuration.*

*48. The tunable antenna system of claim 30, wherein:*

*said controller is programmed to operate in a mode in which the individual lengths of said driven element and said at least one non-driven element may be manually adjusted by a user to form a user antenna configuration; and*

*said controller is programmed to operate in a mode in which a user may store said user antenna configuration in said memory.*

*49. The tunable antenna system of claim 46, wherein:*

*at least two non-driven elements are spaced apart from and aligned parallel to said driven element; and*

*said controller is configured to operate in a mode in which data from said memory is used to adjust the lengths of said driven element and said at least two non-driven elements to configure them as a yagi-type antenna wherein one non-driven element acts as director element and another non-driven element acts as a reflector element.*

*50. The tunable antenna system of claim 49, wherein said controller is programmed to operate in a mode in which data from said memory is used to adjust the lengths of said at least two non-driven elements to reverse the identities of the director element and the reflector element.*

*51. The tunable antenna system of claim 49, wherein said controller is configured to operate in a mode in which data from said memory is used to adjust the lengths of said at least two non-driven elements to reverse the identities of the director element and the reflector element to form a bi-directional antenna.*

*52. The tunable antenna system of claim 49, wherein said controller is programmed to operate in a mode in which data from said memory is used to adjust the lengths of said driven element and said at least one non-driven element to configure a yagi-type antenna for a selected frequency band in response to a user pressing a single button.*

*53. The tunable antenna system of claim 52, wherein said controller is programmed to operate in a mode in which data from said memory is used to adjust the lengths of said driven element and said at least one non-driven element to scroll through said selected frequency band in fixed frequency increments in response to a user pressing a single button.*

*54. The tunable antenna system of claim 45, wherein said controller is programmed to operate in a mode in which data from said memory is used to adjust the lengths of said driven element and said at least one non-driven elements by a selected frequency offset in response to a user pressing a single frequency-up or frequency-down button.*

*55. The tunable antenna system of claim 45, wherein said controller is programmed to operate in a mode in which the individual lengths of said driven element, said director, and said reflector may be manually adjusted by a user.*

*56. The tunable antenna system of claim 22, further including an SWR-sensing circuit and wherein said controller includes a programmable microprocessor or microcontroller and is programmed to operate in a mode in which the length of said driven element is adjusted to achieve a minimum SWR at a selected frequency.*

*57. The tunable antenna system of claim 22, further including a radio coupled to said controller, said radio communicating frequency data to said controller and wherein said controller is configured to operate in a mode in which said frequency data from said radio is used to adjust the length of said driven element to resonate at a frequency represented by said frequency data.*

*58. The tunable antenna system of claim 30, further including an SWR-measuring circuit and wherein said controller includes a programmable microprocessor or microcontroller and is further programmed to operate in a mode that adjusts the lengths of said driven element and said at least one non-driven element to achieve a minimum SWR at a selected frequency.*

*59. The tunable antenna system of claim 30, further including a radio coupled to said controller, said radio communicating frequency data to said controller and wherein said controller is configured to operate in a mode in which said frequency data from said radio is used to adjust the length of said driven element and said at least one non-driven element to configure a yagi antenna resonant at a frequency represented by said frequency data.*

*60. The tunable antenna system of claim 40, further including an SWR-measuring circuit and wherein said controller includes a programmable microprocessor or microcontroller and is further programmed to operate in a mode that adjusts the lengths of said driven element and said at least two non-driven elements to achieve a minimum SWR at a selected frequency.*

*61. The tunable antenna system of claim 40, further including a radio coupled to said controller, said radio communicating frequency data to said controller and wherein said controller is configured to operate in a mode in which said frequency data from said radio is used to adjust the length of said driven element and said at least two non-driven elements to configure a yagi antenna resonant at a frequency represented by said frequency data.*

*62. The tunable antenna system of claim 22, wherein said transmission-line coupler is electrically coupled to said driven element through an impedance-matching network.*

*63. The tunable antenna system of claim 62, wherein said impedance-matching network is an L network including an inductor coupled across the first and second conductive members of said driven element.*

*64. The tunable antenna system of claim 61, wherein said impedance-matching network is a unun and balun coupled between said driven element and said transmission-line coupler.*

*65. The tunable antenna system of claim 30, further including:*

*a second driven element, said second driven element comprising a fifth support arm formed from non-conductive material, said fifth support arm being hollow and including a fifth conductive member disposed therein, said fifth conductive member being length-adjustable, and a sixth support arm formed from non-conductive material, said sixth support arm being hollow and*

*including a sixth length-adjustable conductive member disposed therein, said sixth conductive member being length-adjustable;*

*length-adjusting means for adjusting the length of said fifth and sixth conductive members;*

*a transmission-line coupler electrically coupled to said second driven element; and,*

*wherein said controller is coupled to said length-adjusting means of said second driven element, for causing said length-adjusting means to adjust the length of said fifth and sixth conductive members of said second driven element to resonate at a desired frequency.*

*66. The tunable antenna system of claim 21, wherein said conductive material is formed from a copper and beryllium alloy.*

*67. The tunable antenna system of claim 33, wherein said conductive material is formed from a copper and beryllium alloy.*

*68. A tunable antenna element comprising:*

*a support arm formed from a non-conductive material, said support arm having a longitudinal chamber disposed therein;*

*a length-adjustable conductive member disposed within said longitudinal chamber;*

*a length-adjuster configured to adjust the length of said conductive member disposed in said longitudinal chamber; and*

*a transmission-line coupler electrically coupled to said antenna element.*

*69. The tunable antenna element of claim 68, further including a controller, coupled to said length-adjuster, for causing said length-adjuster to adjust the length of said conductive member in said longitudinal chamber to resonate at a desired frequency.*

*70. The tunable antenna element of claim 68, wherein said length-adjuster is disposed in a housing that mechanically supports said support arm.*

*71. The tunable antenna element of claim 70, wherein the support arm is substantially straight and extends from the housing.*

*72. The tunable antenna element of claim 68, wherein said length-adjuster includes a spool upon which said conductive member is wound, and at least one motor coupled to said conductive member to selectively wind and unwind said conductive member from said spool and into and out of said longitudinal chamber.*

*73. The tunable antenna element of claim 68, wherein the transmission-line coupler disposed in said housing and in electrical contact with said conductive member at a position proximate to said spool.*

*74. The tunable antenna element of claim 69, wherein said controller includes a programmable microprocessor or microcontroller coupled to said motor to precisely control the length of said conductive member.*

*75. The tunable antenna element of claim 72, wherein:*

*said conductive member is formed as a flat strip including a series of spaced-apart holes formed along a lengthwise axis thereof;*

*said motor is bi-directional and is mechanically coupled to a sprocketed wheel mounted on a drive shaft, sprockets on said wheel engaging said series of spaced-apart holes, whereby when said motor is activated, said sprocketed wheel winds and unwinds said conductive member from said spool into and out of said support arms.*

*76. The tunable antenna element of claim 68 wherein said support arm comprises a plurality of nested telescoping tube sections formed from said non-conductive material.*

*77. The tunable antenna element of claim 70, wherein said support arm is mounted to said housing by seating it inside a rigid pipe attached to said housing.*

*78. The tunable antenna element of claim 68, wherein the free end of said conductive member is fitted with a rounded-end tip enabling said conductive member to slide freely inside said support arm.*

*79. The tunable antenna element of claim 69, wherein said controller includes a programmable microprocessor or microcontroller and is coupled to a non-volatile memory storing length data for said antenna element.*

*80. The tunable antenna system of claim 79, wherein at least a portion of said length data corresponds to a plurality of selected antenna configurations.*

*81. The tunable antenna element of claim 69, wherein said controller includes a programmable microprocessor or microcontroller and is programmed to operate in a mode in which the length of said antenna element may be manually adjusted by a user.*

*82. The tunable antenna element of claim 69, wherein:*

*said controller is programmed to operate in a mode in which the length of said antenna element may be manually adjusted by a user to form an antenna configuration; and*

*said controller is programmed to operate in a mode in which a user may store said user antenna configuration in said memory.*

*83. The tunable antenna system of claim 80 wherein said controller is configured to operate in a mode in which data from said memory is used to adjust the length of said antenna element for a selected frequency band in response to a user pressing a single button.*

*84. The tunable antenna system of claim 83, wherein said controller is programmed to operate in a mode in which data from said memory is used to adjust the lengths of said antenna element to scroll through said selected frequency band in fixed frequency increments in response to a user pressing a single button.*

*85. The tunable antenna element of claim 80, wherein said controller is programmed to operate in a mode in which data from said memory is used to adjust the length of said antenna element by a selected frequency offset in response to a user pressing a single frequency-up or frequency-down button.*

*86. The tunable antenna system of claim 69, further including an SWR-sensing circuit and wherein said controller includes a programmable microprocessor or microcontroller and is programmed to operate in a mode in which the length of said antenna element is adjusted to achieve a minimum SWR at a selected frequency.*

*87. The tunable antenna element of claim 68, wherein said transmission-line coupler is electrically coupled to said antenna element through an impedance-matching network.*

*88. A tunable antenna system, comprising:*

*a driven element, said driven element comprising a first support arm formed from non-conductive material, said first support arm being hollow and including a first conductive member disposed therein, said first conductive member being length-adjustable, and a second support arm formed from non-conductive material, said second support arm being hollow and including a second conductive member disposed therein, said second conductive member being length-adjustable;*

*length-adjusting means for adjusting the length of said first and second conductive members disposed, respectively, in said first and second support arms; and*

*a transmission-line coupler electrically coupled to said driven element.*

*89. The tunable antenna system of claim 88 further including a controller, coupled to said length-adjusting means, for causing said length-adjusting means to adjust the length of said first and second conductive members in said driven element to resonate at a desired frequency.*

*90. The tunable antenna system of claim 88, wherein said length-adjusting means is disposed in a housing that mechanically supports said first and second support arms.*

*91. The tunable antenna system of claim 90, wherein said first and second support arms are substantially straight and extend in opposite directions from the housing.*

*92. The tunable antenna system of claim 88, wherein said length-adjusting means includes at least one motor coupled to said first and second conductive members and driven by said controller to selectively adjust the length of said first conductive member in said first support arm and to selectively adjust the length of said second conductive member in said second support arm to form an adjustable-frequency dipole element.*

*93. The tunable antenna system of claim 89, wherein said controller includes a programmable microprocessor or microcontroller coupled to said motor to precisely control the length of said first and second conductive members.*

*94. The tunable antenna system of claim 91, wherein:*

*each of said first and second conductive members is formed as a flat strip including a series of spaced-apart holes formed along a lengthwise axis thereof;*

*said at least one motor is a bi-directional motor and is mechanically coupled to a sprocketed wheel mounted on a drive shaft, sprockets on said wheel engaging said series of spaced-apart holes, whereby when said bi-directional motor is activated, said sprocketed wheel winds and unwinds each of said first and second conductive members from its spool into and out of its support arm.*

*95. The tunable antenna system of claim 89, wherein said transmission-line coupler disposed in said housing and in electrical contact with said first and second conductive members at a position proximate to their spools.*

*96. The tunable antenna system of claim 88, wherein each of said first and second support arms comprises a plurality of nested telescoping tube sections formed from said non-conductive material.*

*97. The tunable antenna system of claim 89, further including:*

*at least one non-driven element spaced apart from said driven element, said at least one non-driven element comprising a third support arm formed from non-conductive material, said third support arm being hollow and including a third conductive member disposed therein, said third conductive member being length-adjustable, and a fourth support arm formed from non-conductive material, said fourth support arm being hollow and including a fourth length-adjustable conductive member disposed therein, said fourth conductive member being length-adjustable; and*

*length-adjusting means for adjusting the length of said third and fourth conductive members and coupled to said controller.*

*98. The tunable antenna system of claim 97, wherein:*

*said length-adjusting means for said driven element is disposed in a first housing that mechanically supports said first and second support arms; and*

*said length-adjusting means for said non-driven element is disposed in a second housing that mechanically supports said third and fourth support arms.*

*99. The tunable antenna system of claim 98, wherein:*

*said first and second support arms are substantially straight and extend in opposite directions from the first housing; and*

*said third and fourth support arms are substantially straight and extend in opposite directions from the second housing.*

*100. The tunable antenna system of claim 98, wherein:*

*each of said first and second conductive members is wound on a spool;*

*said length-adjusting means for said driven element includes at least one first motor disposed in said first housing and coupled to said first and second conductive members and driven by said controller to selectively wind and unwind said first conductive member from its spool and into and out of said first support arm and to selectively wind and unwind said second conductive member from its spool and into and out of said second support arm;*

*each of said third and fourth conductive members is wound on a spool;*

*said length-adjusting means for said at least one non-driven element includes at least one second motor disposed in said second housing and coupled to said third and fourth conductive members and driven by said controller to selectively wind and unwind said third conductive member from its spool and into and out of said third support arm and to selectively wind and unwind said fourth conductive member from its spool and into and out of said fourth support arm.*

*101. The tunable antenna system of claim 100, wherein said transmission-line coupler is disposed in said first housing and is in electrical contact with said first and second conductive members at a position proximate to their spools.*

*102. The tunable antenna system of claim 97, wherein said controller includes a programmable microprocessor or microcontroller coupled to said at least one first motor to precisely control the length of said first and second conductive members and coupled to said at least one second motor to precisely control the length of said third and fourth conductive members.*

*103. The tunable antenna system of claim 97, wherein:*

*each of said first and second conductive members is formed as a flat strip including a series of spaced-apart holes formed along a lengthwise axis thereof;*

*said at least one first motor is a bi-directional motor and is mechanically coupled to a first sprocketed wheel mounted on a drive shaft, sprockets on said first sprocketed wheel engaging said series of spaced-apart holes in said first and second conductive members, whereby when said at least one first motor is activated, said first sprocketed wheel winds and unwinds each of said first and second conductive members from its spool into and out of its support arm;*

*each of said third and fourth conductive members is formed as a flat strip including a series of spaced-apart holes formed along a lengthwise axis thereof;*

*said at least one second motor is a bi-directional motor and is mechanically coupled to a second sprocketed wheel mounted on a drive shaft, sprockets on said second sprocketed wheel engaging said series of spaced-apart holes in said third and fourth conductive members, whereby when said at least one second motor is activated, said second sprocketed wheel winds and unwinds each of said third and fourth conductive members from its spool into and out of its support arm.*

*104. The tunable antenna system of claim 98 wherein each of said first, second, third, and fourth support arms comprises a plurality of nested telescoping tube sections formed from said non-conductive material.*

*105. The tunable antenna system of claim 98, wherein the first and second housings are attached to a boom.*

*106. The tunable antenna system of claim 97, wherein at least two length-adjustable non-driven elements are spaced apart from and aligned parallel to said driven element.*

*107. The tunable antenna system of claim 103, wherein:*

*each of said first, and second support arms are mounted to said first housing by seating them inside an opposing pair of rigid pipes attached to said housings; and*

*each of said third, and fourth support arms are mounted to said second housing by seating them inside an opposing pair of rigid pipes attached to said housings.*

*108. The tunable antenna system of claim 104 wherein the free end of each said first, second, third, and fourth conductive members is fitted with a rounded-end tip enabling said conductive member to slide freely inside said support arm.*

*109. The tunable antenna system of claim 97, further including at least one fixed-length parasitic element attached to said boom and spaced apart from said driven element and said at least one non-driven element, said fixed-length parasitic element having a length chosen to interact with said driven element and said non-driven element to produce a desired azimuthal radiation pattern at a selected frequency.*

*110. The tunable antenna system of claim 89, wherein said controller includes a programmable microprocessor or microcontroller and is programmed to operate in a mode in which the length of said driven element may be manually adjusted by a user.*

*111. The tunable antenna system of claim 89, wherein said controller includes a programmable microprocessor or microcontroller and is coupled to a non-volatile memory storing length data for said driven element.*

*112. The tunable antenna system of claim 111, wherein at least a portion of said length data corresponds to a plurality of selected antenna configurations.*

*113. The tunable antenna system of claim 112, wherein:*

*said controller is programmed to operate in a mode in which the length of said driven element may be manually adjusted by a user to form a user antenna configuration; and*

*said controller is programmed to operate in a mode in which a user may store said user antenna configuration in said memory.*

*114. The tunable antenna system of claim 112, wherein said controller is programmed to operate in a mode in which data from said memory is used to adjust the length of said driven element to adjust the length of said driven element for a selected frequency band in response to a user pressing a single button.*

*115. The tunable antenna system of claim 114, wherein said controller is programmed to operate in a mode in which data from said memory is used to adjust the length of said driven element to scroll through said selected frequency band in fixed frequency increments in response to a user pressing a single button.*

*116. The tunable antenna system of claim 112, wherein said controller is programmed to operate in a mode in which data from said memory is used to adjust the length of said driven element by a selected frequency offset in response to a user pressing a single frequency-up or frequency-down button.*

*117. The tunable antenna system of claim 97, wherein said controller includes a programmable microprocessor or microcontroller and is programmed to operate in a mode in which the lengths of said driven element and said at least one non-driven element may be manually adjusted by a user.*

*118. The tunable antenna system of claim 97, wherein said controller includes a programmable microprocessor or microcontroller and is coupled to a non-volatile memory storing length data for said driven element and said at least one non-driven element.*

*119. The tunable antenna system of claim 118, wherein at least a portion of said length data corresponds to a plurality of selected antenna configurations.*

*120. The tunable antenna system of claim 119, wherein:*

*said controller is programmed to operate in a mode in which the individual lengths of said driven element and said at least one non-driven element may be manually adjusted by a user to form a user antenna configuration; and*

*said controller is programmed to operate in a mode in which a user may store said user antenna configuration in said memory.*

*121. The tunable antenna system of claim 119, wherein:*

*at least two non-driven elements are spaced apart from and aligned parallel to said driven element; and*

*said controller is configured to operate in a mode in which data from said memory is used to adjust the lengths of said driven element and said at least two non-driven elements to configure them as a yagi-type antenna wherein one non-driven element acts as director element and another non-driven element acts as a reflector element.*

*122. The tunable antenna system of claim 119, wherein:*

*at least two non-driven elements are spaced apart from and aligned parallel to said driven element; and*

*said controller is programmed to operate in a mode in which data from said memory is used to adjust the lengths of said at least two non-driven elements to reverse the identities of the director element and the reflector element.*

*123. The tunable antenna system of claim 119, wherein:*

*at least two non-driven elements are spaced apart from and aligned parallel to said driven element; and*

*said controller is configured to operate in a mode in which data from said memory is used to adjust the lengths of said at least two non-driven elements to reverse the identities of the director element and the reflector element to form a bi-directional antenna.*

*124. The tunable antenna system of claim 119, wherein said controller is programmed to operate in a mode in which data from said memory is used to adjust the lengths of said driven element and said at least one non-driven element to configure a yagi-type antenna for a selected frequency band in response to a user pressing a single button.*

*125. The tunable antenna system of claim 119, wherein said controller is programmed to operate in a mode in which data from said memory is used to adjust the lengths of said driven element and said at least one non-driven element to scroll through said selected frequency band in fixed frequency increments in response to a user pressing a single button.*

*126. The tunable antenna system of claim 119, wherein said controller is further programmed to operate in a mode in which data from said memory is used to adjust the lengths of said driven element and said at least one non-driven elements by a selected frequency offset in response to a user pressing a single frequency-up or frequency-down button.*

*127. The tunable antenna system of claim 89, further including an SWR-sensing circuit and wherein said control-*

*ler includes a programmable microprocessor or microcontroller and is programmed to operate in a mode in which the length of said driven element is adjusted to achieve a minimum SWR at a selected frequency.*

*128. The tunable antenna system of claim 89, further including a radio coupled to said controller, said radio communicating frequency data to said controller and wherein said controller is configured to operate in a mode in which said frequency data from said radio is used to adjust the length of said driven element to resonate at a frequency represented by said frequency data.*

*129. The tunable antenna system of claim 97, further including an SWR-measuring circuit and wherein said controller includes a programmable microprocessor or microcontroller and is further programmed to operate in a mode that adjusts the lengths of said driven element and said at least one non-driven element to achieve a minimum SWR at a selected frequency.*

*130. The tunable antenna system of claim 97, further including a radio coupled to said controller, said radio communicating frequency data to said controller and wherein said controller is configured to operate in a mode in which said frequency data from said radio is used to adjust the length of said driven element and said at least one non-driven element to configure an antenna resonant at a frequency represented by said frequency data.*

*131. A method for transmitting an RF signal from an antenna, the method comprising:*

*using a transmission-line coupler to couple the RF signal to a driven element of the antenna; and*

*adjusting the length of a length-adjustable conductive member to resonate the driven element, said adjusting further including receiving a portion of the length-adjustable conductive member in a hollow support arm formed from non-conductive material and storing another portion of the length-adjustable conductive member on a spool.*

*132. The method of claim 131, further comprising:*

*controlling said adjusting with a controller coupled to control a stepper motor coupled to the spool.*

*133. The method of claim 132, wherein:*

*said controlling includes*

*selecting a desired transmission frequency and, in response thereto, adjusting the length of the length-adjustable conductive member within the hollow support arm.*

*134. The method of claim 132, wherein:*

*said controlling includes*

*selecting a desired antenna pattern and, in response thereto, adjusting the length of the length-adjustable conductive member within the hollow support arm.*

*135. The method of claim 132, wherein:*

*said controlling includes*

*selecting a desired frequency band and, in response thereto, adjusting the length of the length-adjustable conductive member within the hollow support arm.*

*136. The method of claim 132, wherein:*

*said controlling includes*

*receiving frequency data at the controller from an attached radio and, in response thereto, adjusting the length of the length-adjustable conductive member within the hollow support arm.*

*137. The method of claim 132, wherein:*

*said controlling includes*

*receiving SWR information from a SWR-sensing circuit coupled to measure SWR in the RF signal; and*

*adjusting the length of the length-adjustable conductive member within the hollow support arm so as to minimize the measured SWR.*

*138. The method of claim 132, wherein:*

*said controlling includes*

*receiving SWR information from a SWR-sensing circuit coupled to measure SWR in the RF signal; and*

*adjusting the length of the length-adjustable conductive member within the hollow support arm so as to achieve a selected maximum measured SWR value.*

*139. A controller for controlling a tunable antenna, the controller comprising:*

*circuitry configured to cause the tunable antenna to adjust the length of a length-adjustable conductive member within a hollow support arm of a driven element of the tunable antenna;*

*a SWR-sensing circuit coupled to measure SWR in an RF signal coupled to the driven element; and*

*a programmable processor configured to execute a program of instructions to cause said circuitry to adjust the length of the length-adjustable conductive member within the hollow support arm so as to minimize the measured SWR.*

*140. A controller for controlling a tunable antenna, the controller comprising:*

*circuitry configured to cause the tunable antenna to adjust the length of a length-adjustable conductive member within a hollow support arm of a driven element of the tunable antenna;*

*a memory storing length data for the length-adjustable conductive member;*

*at least one frequency-select button; and*

*a programmable processor configured to execute a program of instructions to cause said circuitry to adjust the length of the length-adjustable conductive member within the hollow support arm in response to input from the at least one frequency-select button.*

*141. A controller for controlling a tunable antenna, the controller comprising:*

*circuitry configured to cause the tunable antenna to adjust the length of a length-adjustable conductive member within a hollow support arm of a driven element of the tunable antenna;*

*a memory storing length data for the length-adjustable conductive member;*

*at least one frequency-input button; and*

*a programmable processor configured to execute a program of instructions to store length data entered by a user and to cause said circuitry to adjust the length of the length-adjustable conductive member within the hollow support arm in response to length data stored by a user.*

* * * * *